(12) United States Patent
Moranta et al.

(10) Patent No.: US 9,003,043 B1
(45) Date of Patent: Apr. 7, 2015

(54) TECHNIQUES FOR CLIENT AND SERVER COMMUNICATION

(75) Inventors: Vicente Moranta, Raleigh, NC (US); Mark A. Parenti, Milford, NH (US); Ralph Johnson Marshall, Hillsborough, NC (US)

(73) Assignee: EMC Corporation, Hopkinton, MA (US)

( * ) Notice: Subject to any disclaimer, the term of this patent is extended or adjusted under 35 U.S.C. 154(b) by 1265 days.

(21) Appl. No.: 12/316,816

(22) Filed: Dec. 17, 2008

(51) Int. Cl.
*H04L 29/06* (2006.01)
*H04L 29/08* (2006.01)

(52) U.S. Cl.
CPC ..................... *H04L 67/26* (2013.01)

(58) Field of Classification Search
USPC .......................................... 709/227
See application file for complete search history.

(56) References Cited

U.S. PATENT DOCUMENTS

| 7,587,450 | B2* | 9/2009 | Morris ........................ 709/203 |
| 2004/0003093 | A1* | 1/2004 | Kamath ....................... 709/227 |
| 2006/0095573 | A1* | 5/2006 | Carle et al. .................. 709/227 |
| 2007/0174428 | A1* | 7/2007 | Lev Ran et al. ............. 709/218 |

OTHER PUBLICATIONS

Fielding et al., "Hypertext Transfer Protocol—HTTP/1.1," Jun. 1999.*
Wikipedia, "Chunked transfer encoding."*
"*The Two HTTP Connection Limit*" Issue, From Runtime Wiki, Retrieved from: http://www.openajax.org/runtime/wiki/The_Two_HTTP_Connection_Limit_Issue.com; Sep. 17, 2008; 6 pages.
B. Krishnamurthy, J. C. Mogul and D. M. Kristol; "*Key Differences between HTTP/1.0 and HTTP/1.1.*", IEEE Network, 11(6):10-23, Nov./Dec. 1997; Retrieved from: http://www.research.att.com/~bala/papers/h0vh1.html; 21 Pages.
"*Code: The Two-connection limit*", Chapter 8—Ajax Optimization; Retrieved from: http://www.websiteoptimization.com/secrets/ajax/two-connection-limit.html; Jul. 8, 2008; Copyright 2002-2008 Website Optimization, LLC; 1 page.
"*8.7. Minimizing HTTP Requests*", O'Reilly Safari Books Online; Retrieved from: http://safari.oreilly.com/9780596515089/minimizing_http_requests.com; 2008; 2 pages.
(Continued)

*Primary Examiner* — Andrew Georgandellis
(74) *Attorney, Agent, or Firm* — Muirhead and Saturnelli, LLC

(57) ABSTRACT

Described are techniques for facilitating communications between a client and a server. A first communication connection is opened between the client and server and remains open for a duration of a session. In response to receiving a client request, a second communication connection is opened. The client request is sent over the second communication connection to the server. A first response is sent to said client over the second communication connection. The second communication connection is closed. The client request is serviced and a data portion indicating a status is sent to the client over the first communication connection. The data portion is included in a second response sent from the server to the client over the first communication connection. If there are other client requests received by the server and processed during the session, additional data portions for the other client requests are included in the second response.

20 Claims, 15 Drawing Sheets

(56) References Cited

OTHER PUBLICATIONS

David Methvin; "*The Well-Tuned PC*", Internet Explorer Tweaks; Retrieved from: http://www.pctoday.com/editorial/article.asp?article=articles%2F2006%2Ft0409%2F26t09%2F26t09.com; Sep. 2006, vol. 4 Issue 9; pp. 26-27.

HTTP Made Really Easy, "*A Practical Guide to Writing Clients and Servers*"; Retrieved from: http://www.jmarshall.com/easy/http/; Copyright 1997 James Marshall; 17 pages.

* cited by examiner

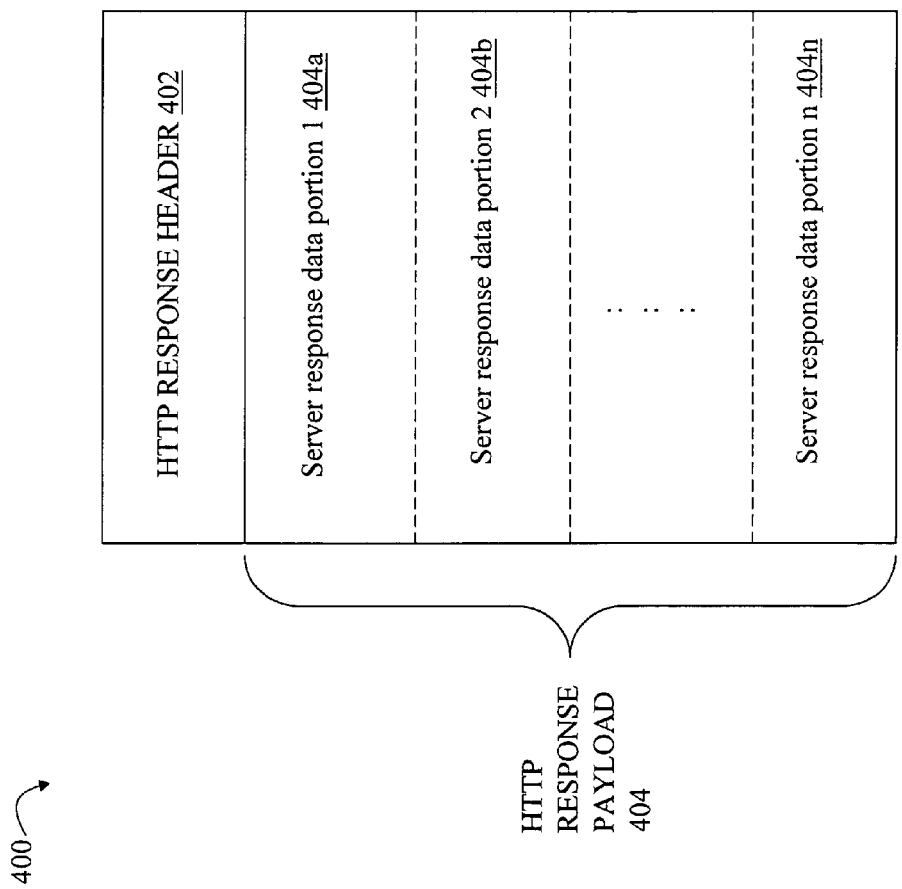

TECHNIQUES FOR CLIENT AND SERVER COMMUNICATION

BACKGROUND

1. Technical Field

This application relates generally to techniques for facilitating communications such as between a client and a server.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

Different tasks may be performed in connection with a data storage system such as for data storage system management. A user, such as a data storage system administrator, may perform data storage system management operations and tasks to manage the data storage system. The user may perform the foregoing using a web browser located on a management computer system which is in communication with the data storage system so that the user can issue commands to the data storage system to perform tasks, view and obtain data storage system status information, and the like. The management computer system may include client management software executing in the context of the web browser which periodically polls one or more data storage systems to obtain data storage system state information. Each of the data storage systems may execute instructions to report updates to the client system management software in response to the polling request.

The foregoing technique may have existing drawbacks. The reporting by each data storage system at each interval may consume an unacceptable amount of resources of the management computer system on which the client management software is executing, the data storage system(s) being polled, and/or the network facilitating the communications therebetween. For example, the number of incoming messages to be processed by the management computer system increases with the number of data storage systems and may eventually saturate or "flood" the management computer system even though the returned polling messages indicate no change or insignificant change with regard to status. Additionally, reporting at periodic intervals means that any reported updates or events regarding data storage system status take at least until the next interval to be communicated to the management console so that reporting an important or significant event may be delayed until the next reporting interval. Thus, the management computer system may be displaying, for example, stale or outdated information or may be informed about an event within an unacceptable amount of time. Resources of the data storage systems may also be unnecessarily consumed by processing and reporting on data storage system state even though there may be no significant or noteworthy events.

Additionally, the client management software may include a web browser that communicates with a web server or other software on the data storage system using a standard communications protocol such as HTTP (Hypertext Transfer Protocol). Such protocols may have limitations, guidelines or recommendations which when implemented create a potential bottleneck in connection with processing polling requests and other requests from the client management software to perform data storage system management operations. For example, as known in the art, HTTP V1.1 has a two HTTP connection limit as a guideline adopted or imposed by some web browsers such that the web browser can only have two active logical HTTP connections to one given server in a domain at a time. In other words, at most two outstanding HTTP requests may be issued from the web browser to a web server for a particular domain name. As a result, if there are two outstanding polling requests each issued over a different HTTP connection to the web server, any subsequent data storage system management operation is not communicated to the data storage system's web server until one of the two connections closes. In typical HTTP communications, the HTTP connection is opened by the client, such as by the management computer system, when an HTTP request is communicated to a server. The HTTP connection is closed once the response has been sent from the server to the client. As such, outstanding polling requests may cause unacceptable delays in performing subsequently issued user requests for data storage system management operations that may be issued interactively or otherwise.

Thus, it may be desirable to have an efficient technique for reporting events and updates regarding one or more data storage systems in a timely manner. It may be desirable that the technique be scalable for use with a varying number of data storage systems and events occurring therein. It may also be desirable that such techniques provide for efficient use of resources.

SUMMARY OF THE INVENTION

In accordance with one aspect of the invention is a method for facilitating communications between a client and a server comprising opening a first communication connection between the client and the server, wherein said first communication connection remains open for a duration of a session between the client and the server; in response to receiving a client request on the client, opening a second communication connection, sending said client request over said second communication connection from said client to said server, sending a first response from said server to said client over the second communication connection, and closing the second communication connection, wherein said first response indicates that said client request has been received by said server; performing, by the server processing to service the client request; and sending a data portion indicating a status of the client request to the client over the first communication connection, wherein said data portion is included in a second response sent from the server to the client, wherein if there are other client requests from the client received by the server and processed during said session, additional data portions for said other client requests are included in the second response. For the duration of the session, only a single response may be sent from the server to the client over said first communication connection at an application level, said single response being said second response and including data portions for all client requests sent from the client to the server which are processed during the session. The second response may include one or more data portions for one or more corresponding asynchronous events reported from the server to the client, each of said asynchronous events being in response to an occurrence of at least one data storage system event. The at least one data storage system event may include at least one of: a change in data storage system state, an error of a data storage system component, a status change for a data storage system component, a device error, a power supply level, and a device replacement. The second response may include at least one data portion which is not included in response to a received client request from the client. The first response may not provide an indication regarding servicing status or completion status of the client request. The server may include a web server in a data storage system. The client may include a web browser executing code providing a user interface used to input client requests on a computer system in communication with the data storage system. The first communication connection and said second communication connection may be connections used for communications between the client and the server in accordance with an industry standard communication protocol at an application network level. The industry standard protocol may be a hypertext transfer protocol. For each client request sent from the client to the server, said steps of opening the second communication connection, sending said each client request over said second communication connection from said client to said server, sending another response from said server to said client over the second communication connection, and closing the second communication connection, may be performed for said each client request, wherein said another response may indicate that said each client request has been received by said server and does not provide an indication regarding a status of processing on said server with respect to servicing said each client request. Data portions included in the second response may be included in a payload of the second response in accordance with a format delimiting each of the data portions enabling said client to partition said payload and extract said data portions therefrom. For the duration of the session, a single request may be sent from the client to the server and a single response is sent from the server to the client over the first communication connection, said second response being said single response. The method may also include opening one or more other communication connections between said client and said server at a point in time, each of said one or more other communication connections either remaining open for the duration of the session and being used to transmit only a single response thereon from the server to the client, or being opened and closed for each client request and corresponding response communicated thereon between the client and the server. The second response may be a single message in accordance with a communication protocol, said single message having a payload comprising one or more data portions, each of said data portions corresponding to a client request received by the server or an event occurring on the server being reported to the client, said first communication connection being used to asynchronously report information to the client.

In accordance with another aspect of the invention is a computer readable medium comprising executable code stored thereon for facilitating communications between a client and a server, the computer readable medium comprising executable code for: opening one or more instances of a first communication connection between the client and the server, wherein each instance of said first communication connection remains open for a duration of a session between the client and the server; opening up to a maximum number of instances of a second communication connection at a point in time used to submit client requests to the server, wherein, in response to receiving a client request on the client, an instance of said second communication connection is opened, said client request is sent over said instance of the second communication connection from said client to said server, an acknowledgment message is sent from said server to said client over the instance of the second communication connection, and the instance of the second communication connection is closed; performing, by the server, processing to service the client request; and sending a data portion indicating a status of the client request to the client over one of said instances of the first communication connection, wherein said data portion is included in a single response sent from the server to the client over the said one instance of the first communication connection for the duration of the session, wherein if there are other client requests from the client received by the server and processed during said session, additional data portions for said other client requests are included in the response.

In accordance with another aspect of the invention is a computer readable medium comprising executable code stored thereon for facilitating communications between a client and a server, the computer readable medium comprising executable code for: opening a first communication connection between the client and the server, wherein said first communication connection remains open for a duration of a session between the client and the server; in response to receiving a client request on the client, opening a second communication connection, sending said client request over said second communication connection from said client to said server, sending a first response from said server to said client over the second communication connection, and closing the second communication connection, wherein said first response indicates that said client request has been received by said server; performing, by the server processing to service the client request; and sending a data portion indicating a status of the client request to the client over the first communication connection, wherein said data portion is included in a second response sent from the server to the client, wherein if there are other client requests from the client received by the server and processed during said session, additional data portions for said other client requests are included in the second response. For the duration of the session, only a single response may be sent from the server to the client over said first communication connection at an application level, said single response being said second response and including data portions for all client requests sent from the client to the server which are processed during the session. The second response may include one or more data portions for one or more corresponding asynchronous events reported from the server to the client, each of said asynchronous events being in response to an occurrence of at least one data storage system event. The at least one data storage system event may include at least one of: a change in data storage system state, an error of a data storage system component, a status change for a data storage system component, a device error, a power supply level, and a device replacement.

BRIEF DESCRIPTION OF THE DRAWINGS

Features and advantages of the present invention will become more apparent from the following detailed description of exemplary embodiments thereof taken in conjunction with the accompanying drawings in which:

FIGS. 9A and 9B are more detailed examples of an HTTP response that may be sent over one of the connections between the client and the server in an embodiment using the techniques herein.

DETAILED DESCRIPTION OF EMBODIMENT(S)

Figure 1:
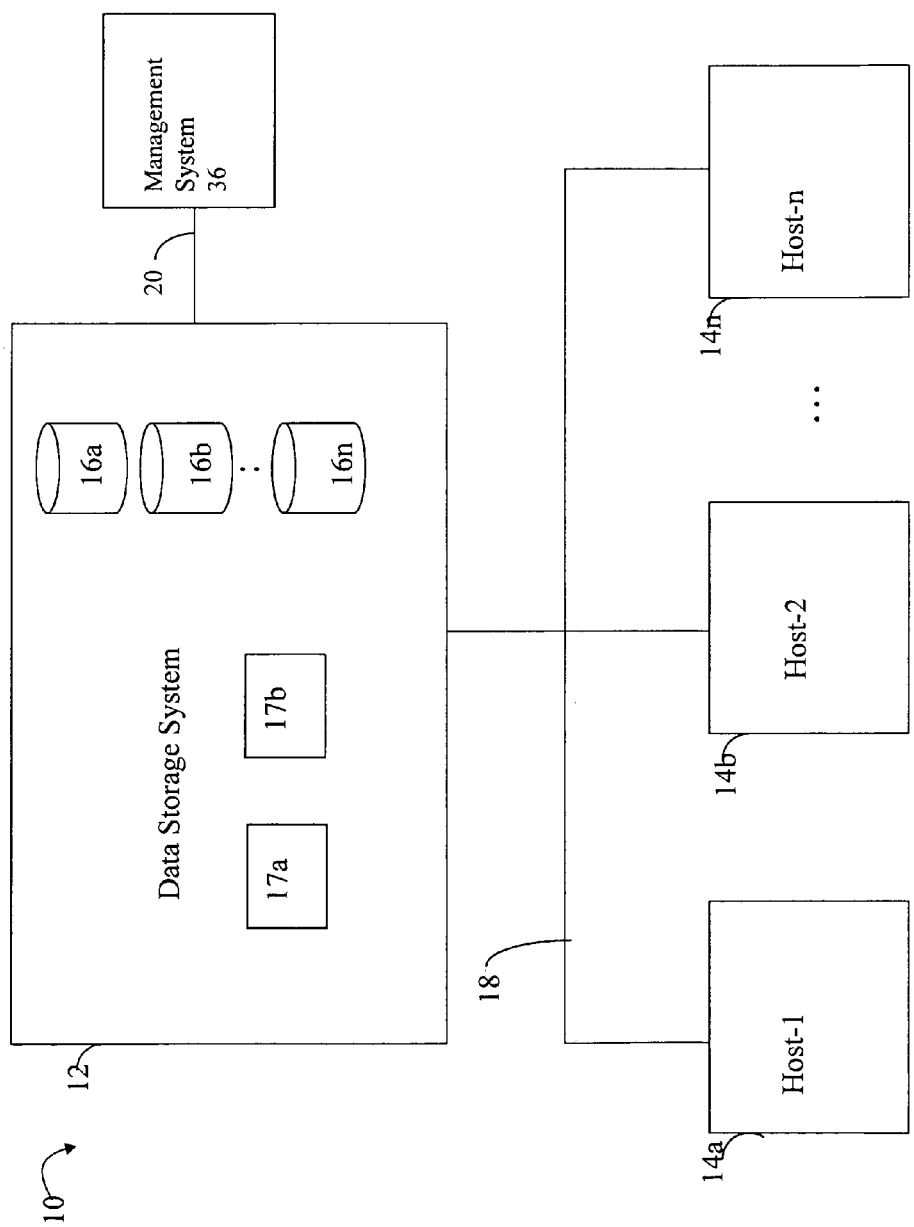
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. The system 10 also includes a management system 36 connected to one or more data storage systems 12 through communication medium 20. In this embodiment of the system 10, the n hosts 14a-14n may access the data storage system 12 using communication medium 18, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10. In one embodiment, the communication medium 20 may be a LAN connection and the communication medium 18 may be an iSCSI or fibre channel connection.

Each of the host systems 14a-14n and the data storage system 12 included in the system 10 may be connected to the communication medium 18 by any one of a variety of connections as may be provided and supported in accordance with the type of communication medium 18. Similarly, the management system 36 may be connected to the communication medium 20 by any one of variety of connections in accordance with the type of communication medium 20. The processors included in the host computer systems 14a-14n and management system 36 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n, management system 36, and data storage systems may all be located at the same physical site, or, alternatively, may also be located in different physical locations. Examples of the communication medium that may be used to provide the different types of connections between the host computer systems and the data storage system, and between the data storage system and the management system of the system 10 may use a variety of different communication protocols such as SCSI, Fibre Channel (FC), iSCSI, and the like. Some or all of the connections by which the hosts, management system, and data storage system may be connected to the communication mediums may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array, such as a CLARiiON® data storage array by EMC Corporation of Hopkinton, Mass., including a plurality of data storage devices 16a-16n and a plurality of service processors 17a, 17b. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. The service processors 17a, 17b may be computer processing units included in the data storage system for processing requests and commands.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein.

In an embodiment of the data storage system, the data storage devices 16a-16n may include a combination of disk devices and flash devices in which the flash devices may appear as standard Fibre Channel drives to the various software tools used in connection with the data storage array. The disk devices may be any one or more different types of disk devices such as, for example, an ATA disk drive, FC disk drive, and the like. The flash devices may be constructed using different types of memory technologies such as non-volatile semiconductor NAND flash memory forming one or more SLC (single level cell) devices and/or MLC (multi level cell) devices. Additionally, flash memory devices and disk devices are two exemplary types of devices that may be included in a data storage system used in connection with the techniques described herein.

Client software on the management system 36 may be used in connection with performing data storage system management by issuing commands to the data storage system 12 and/or receiving responses from the data storage system 12 over connection 20. In one embodiment, the management system 36 may be a lap top or desk top computer system.

Figure 2:
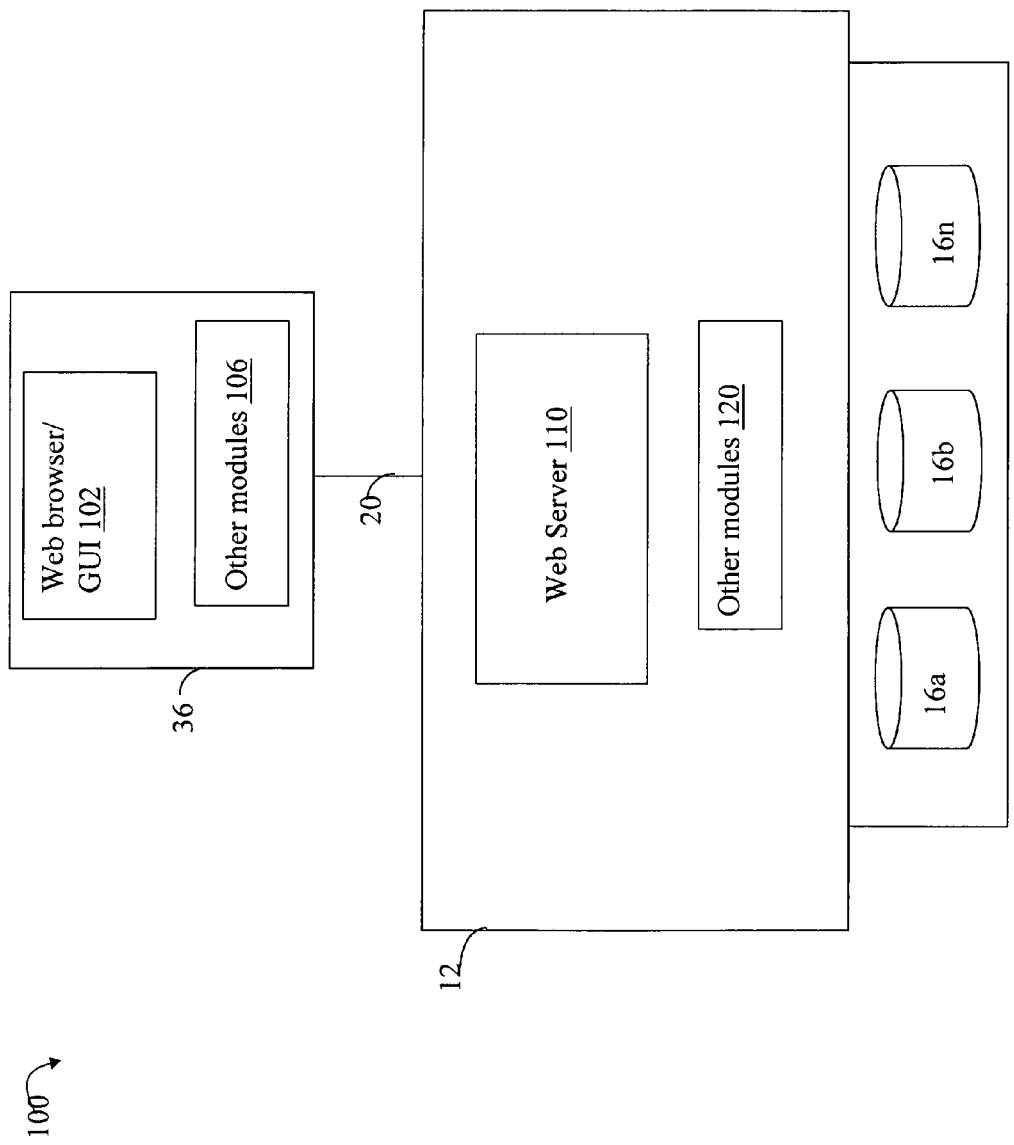
FIGS. 2, 3 and 4 are examples illustrating additional detail regarding components that may be included in an embodiment using the techniques herein.

Referring to FIG. 2, shown is a block diagram 100 of components that may be included in a data storage system and management system for use in connection with the techniques herein. The example 100 illustrates in more detail different modules that may be included in components illustrated in FIG. 1. The data storage system 12 may include a web server 110 and other software or code modules 120. The management system 36 may include a web browser providing a graphical user interface (GUI) 102 for use with the techniques herein and other software or code modules 106. The GUI 102 may be a user interface for client management software executing in the context of a web browser on the system 36. The GUI, and client management software, may communicate with the web server 110 on the data storage system 12 in connection with performing data storage system management operations and tasks.

Element 20 may represent the physical communication medium for facilitating one or logical communication connections between the data storage system 12 and the management system 36 for use with techniques herein. As described in more detail below in one embodiment, the GUI 102 executing in the context of a web browser may communicate with the web server 110 in accordance with the HTTP communications protocol or standard V1.1. The web server 110 may be software modules included in data storage system management software residing and executing on the data storage system 12. The web server 110 may be used in connection with communicating with clients, such as the system 36, over connection 20. The web server may be, for example, an Apache Web Server or other commercially available or proprietary web server, and may be included in data storage system management server code executing on a data storage system 12.

The data storage system 12 may have a network address, such as an IP address. The system 36 may communicate with the data storage system 12 by referencing a URL which resolves to this IP address such as using services of DNS (Domain Name System). Similarly, the system 36 may be identified by an IP address to which the data storage system 12 may direct messages over the connection 20 when performing the techniques herein.

The management system 36 may include code executing thereon which is client software for performing data storage system management. The client software may include the GUI which executes in the context of a web browser as described above. The client portion of the data storage system management may include, for example, scripts and other code that may be downloaded from the data storage system 12, code loaded from a local device of the system 36, and the like. The data storage system management client executing on the system 36 may issue commands in the form of requests to a server portion of the data storage system management software, such as may include the web server 110. One or more responses may be returned to the client issuing the request. As will be described in more detail, the server portion of the data storage system management software executing in the data storage system 12 may include a web server which interfaces and communicates with the client software on the system 36. In one embodiment, the data storage system management client software executing on the system 36 may be a GUI executing in the context of a web browser although other embodiments may vary with the software and protocols utilized.

The communication protocols described herein for purposes of illustration are examples and an embodiment may use other protocols than as described herein for data storage system management transmissions. Transmissions may generally be in any form so long as the GUI is capable of understanding the different possible protocols of the different types of web server(s) of the data storage system 12.

In connection with descriptions herein, the term "client" may be used to generally refer to the management system 36, and/or GUI 102, and the term "server" may be used to generally refer to the data storage system 12, and/or web server 110, in connection with the techniques herein. The terms client and server characterize the relationship with respect to processing described herein and is not meant to limit the possible embodiments with respect to hardware and/or software used in connection with the techniques described herein. With respect to the techniques herein, the client makes requests of a server and the server performs processing in connection with the received requests.

In connection with an embodiment described herein, the GUI 102 and the web server 110 may communicate using HTTP V1.1 although other standard (e.g., non-proprietary) as well as proprietary protocols may be used. An industry standard protocol such as HTTP may be used with techniques herein and may provide particular advantages and benefits. For example, communications performed in accordance with the HTTP protocol may be characterized as "firewall friendly" in that special configuration or modification to the firewall is not typically needed in order to allow communications to proceed. HTTP is a commonly used industry standard protocol so existing firewalls, routers, and the like, typically allow such communications through in accordance with this protocol without requiring special configurations or modification of existing configurations. In contrast, for example, using a proprietary protocol or other protocol not commonly used may require modification to an existing firewall configuration in order to allow communications/traffic through firewall for use in accordance with techniques herein. For example, HTTP traffic may use port 80 and a proprietary application level protocol may use a different port over which existing firewall configurations may filter (e.g., disallow) any network traffic.

Thus, the techniques herein may be used with protocols that may require such modifications in accordance with existing security configurations (e.g., such as those related to a firewall, router, and the like) to permit desired messaging traffic. However, it may be desirable to use HTTP as well as another industry standard or commonly accepted protocol over other protocols for the foregoing as well as other reasons.

In following descriptions for exemplary embodiments illustrating the techniques described herein, communications may proceed using HTTP or HTTPS connections although, as will be appreciated by those skilled in the art, other types of connections in accordance with different protocols may be used.

Figure 3:
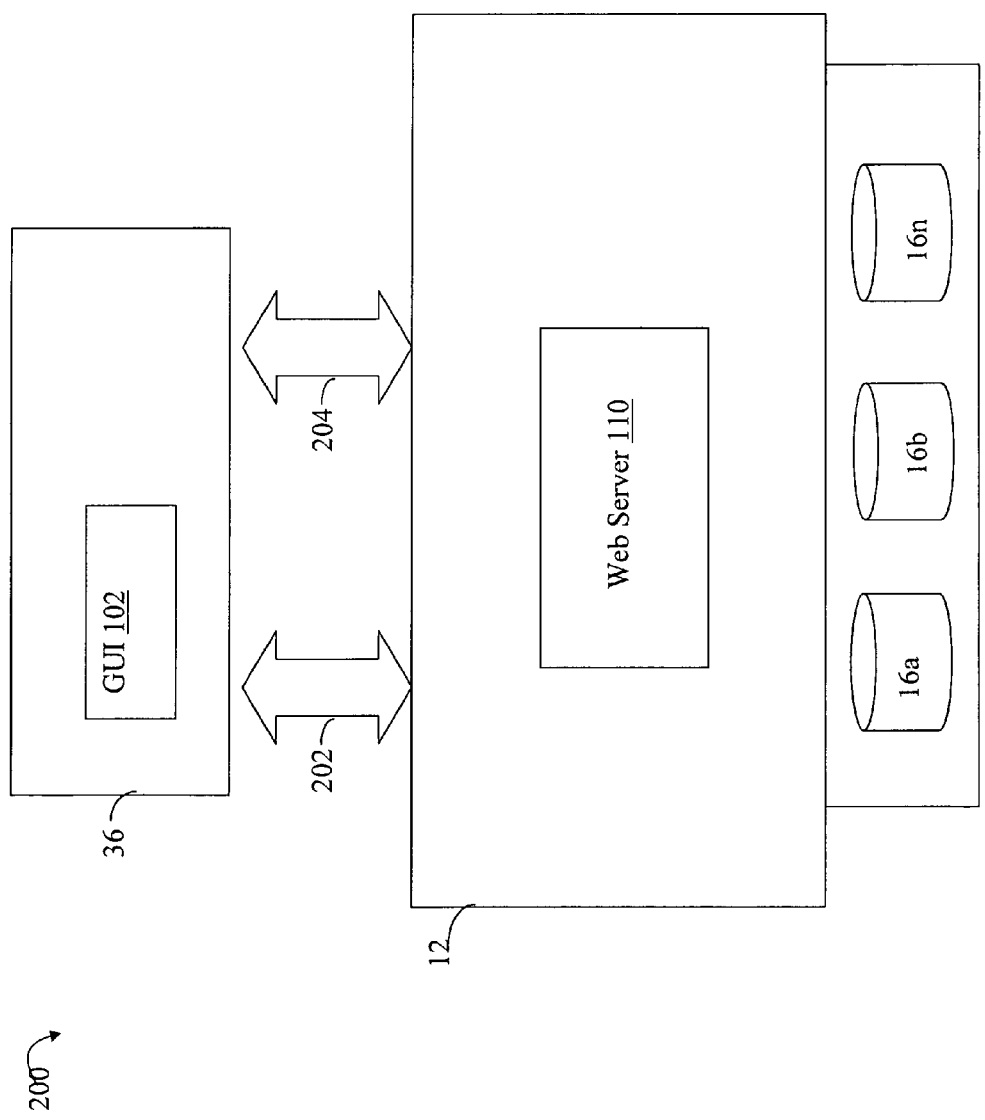

Referring to FIG. 3, shown is an example illustrating HTTP connections that may be used in an embodiment with the techniques herein. The example 200 includes components similar to those as described and illustrated in connection with FIG. 2. Additionally, FIG. 3 includes two HTTP connections 202 and 204 that may be used with performing techniques herein. The HTTP connections 202 and 204 may be characterized as logical communication connections. As will be described in more detail below, connection 202 may be referred to as a first HTTP connection which is open for the duration of the client-server session between the GUI 102 and the web server 110. The first connection 202 may be used for sending asynchronous communications from the data storage system 12, functioning as the server, to the management system 36, functioning as the client. Asynchronous communications from the server to the client may be communicated over HTTP connection 202 where the asynchronous communications include data transmissions in response to previously received client requests from the system 36. The asynchronous communications may also include data transmissions as a result of server initiated events. For example, upon the occurrence of data storage system events (as may be predetermined or selected), the data storage system may report such occurrences to the system 36 over the connection 202.

In accordance with techniques herein, only a single HTTP request and a single HTTP response is sent over the first HTTP connection which is open for the duration of the client-server session. As described in more detail in following paragraphs, the payload or message body of the HTTP response may have an unspecified length and include one or more data portions corresponding to the foregoing asynchronous data communications. In other words, the payload of the single HTTP response message includes data portions corresponding to the data related to the completed or serviced client requests and asynchronous event reporting performed by the data storage system. The foregoing data portions are communicated in a context of the payload of a single HTTP response. In one aspect, each of the foregoing data portions corresponding to a previously received client request may be characterized as a response to the corresponding client request. In accordance with techniques herein, data for such a response may be logically represented as a data portion included with one or more other data portions in a single HTTP response message communicated over the first HTTP connection 202 during a single client-server session (e.g., between the systems 36 and 12 in this example). The single client-server session may result from invocation of the GUI 102 at a point in time which establishes communication with the webs server 110 of the system 12.

Connection 204 may be referred to as a second HTTP connection. The second HTTP connection 204 may be opened when the client 36 sends an HTTP request, such as a data storage system management request as may issued using the GUI 102. The data storage system 12 may send an HTTP response to the received request over connection 204, and then close the second connection 204. In accordance with the techniques herein, the HTTP response which is sent over connection 204 and which corresponds to the client request received by the data storage system serves as an acknowledgement (ACK) or indication that the client request has been received. The HTTP response sent over connection 204 is not sent as a response indicating that the data storage system has completed processing, experienced an error, or the like, with respect to processing or work performed for the client request. Thus, the second HTTP connection does not remain open for the duration while the data storage system is performing work to complete or otherwise service the client request. Rather, in connection with the techniques herein, the second HTTP connection 204 may be used to facilitate submitting, queuing or sending client requests as HTTP requests to the data storage system 12. HTTP responses (sent over the second connection 204 and corresponding to the foregoing HTTP requests also sent over the second connection 204) serve as acknowledgments regarding successful receipt and may provide no indication as to the status of work or completion of the corresponding client request submitted as an HTTP request. Once a received client request has been serviced by the data storage system 12, a data portion as described above and included in an HTTP response may be sent over the first connection 202. As described in more detail in following paragraphs, data portions corresponding to different client requests, data storage system event reports, and the like, may be delimited so that code executing on the system 36 of the GUI may parse, recognize and distinguish between the different data portions.

In accordance with techniques described in an embodiment herein using the HTTP V1.1 protocol as related to the first HTTP connection 202, the server does not specify a length for the HTTP response message and the server also does not close or drop the connection 204 once established for the duration of the client-server session. Rather, the connection 204 remains open for the duration of the client-server session. The client-server session may be terminated, for example, when the web browser on the system 36 is closed, when the system 36 becomes unavailable or goes offline, when the data storage system 12 becomes available or goes offline, due to problems with the physical connection between 12 and 36 causing a communication disconnect between the two systems, and the like.

Figure 4:
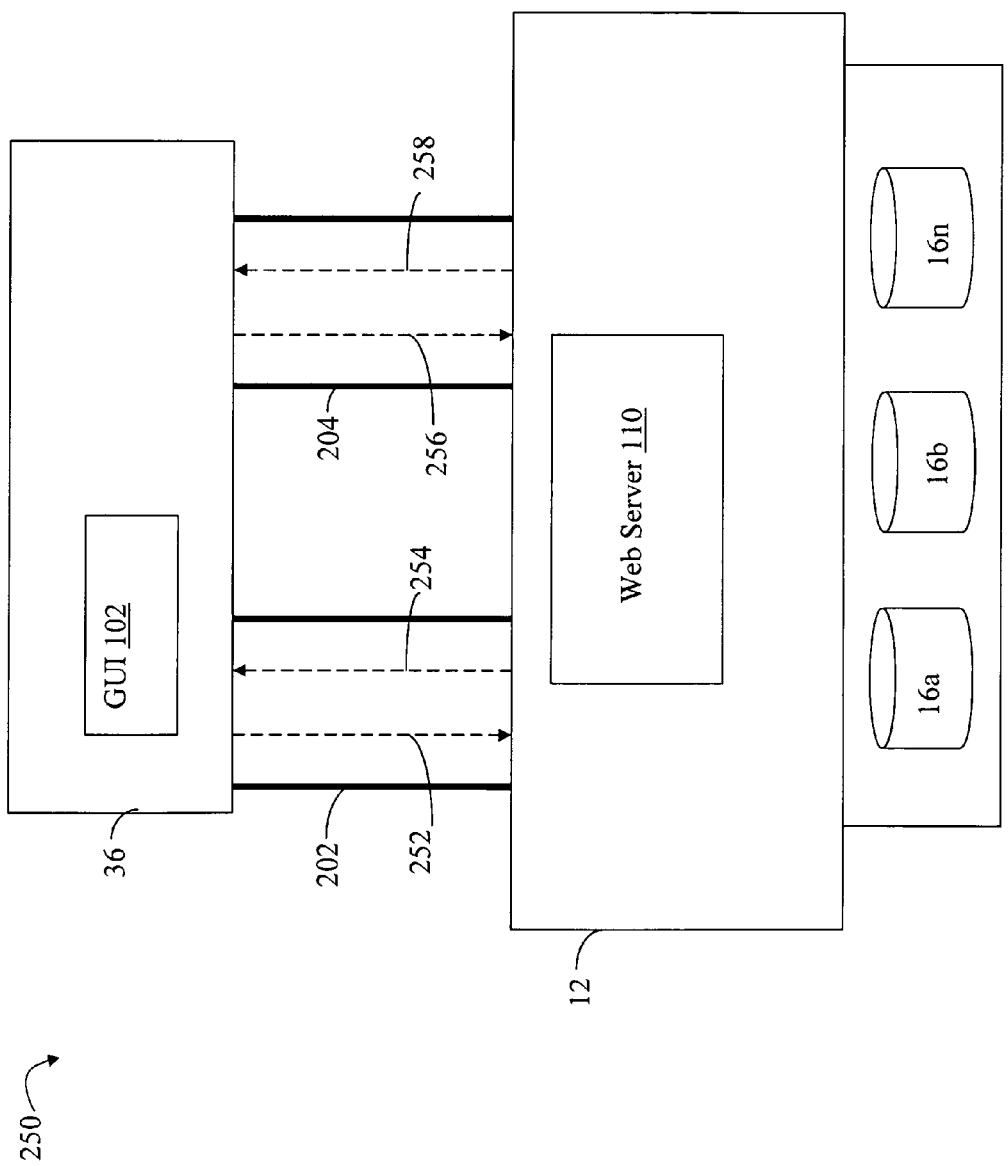

Referring to FIG. 4, shown is an example illustrating HTTP requests and responses that may be sent over the first and second HTTP connections, 202 and 204. The example 250 provides further detail regarding the connections 202 and 204 previously illustrated in FIG. 3. Over the connection 202, a single HTTP request 252 may be sent from the system 36 to the system 12 when the GUI 102 commences a new client-server session. A single HTTP response 254 may be sent from the system 12 to the system 36 over the connection 202 where the payload or message body of the response 254 includes all data portions transmitted from the server to the client as described above and elsewhere herein for the single client-server session. Connection 202 may be established as part of startup or initializing the GUI 102.

Connection 204 is illustrated as a single connection which may be opened and closed in connection with submitting a single client request as an HTPP request 256. When a second client request is submitted as another HTTP request 256, the connection 204 is once again opened and then closed. The foregoing may be repeated for each client request submission. As just described, each of one or more HTTP requests 256 may be sent from the system 36 to the system 12 by using a different instance of the HTTP connection 204. Each of one or more HTTP responses 258 corresponding to one of the forgoing requests 256 may be sent from the system 12 to the system 36 over the particular instance of the connection 204 used to submit the corresponding HTTP request to the system 12. The connection 204 may be opened prior to sending each request 256 and then closed once the server has sent a corresponding HTTP response 258. As described elsewhere herein, each of the corresponding response 258 sent over the second connection 204 may be characterized as an acknowledgement that the corresponding HTTP request 256 for a client request has been received. The HTTP response 258 does not indicate a status regarding work or servicing of the client request embodied in the HTTP request 256. The HTTP connection 204 may be opened and closed for each pair of HTTP request 256 (representing a client request) and corresponding HTTP response 258 indicating acknowledgement of receipt of the single request 256 by the data storage system. Once the HTTP request 256 has been received, it may be processed or serviced by the data storage system 12. Results or response data logically corresponding to the client request (as represented by HTTP request 256) may be returned to the system 36 by the system 12 over the first HTTP connection 202 as a data portion of the single HTTP response 254. The results or response data sent over connection 202 may be characterized as information describing a status of the corresponding client request (previously received HTTP request 256 communicated over connection 204) related to work or servicing performed by the data storage system in accordance with the client request.

Thus, each instance of the second HTTP connection 204 may be used to submit client requests as HTTP requests and acknowledge receipt of these HTTP requests by the server. Data regarding status or completion of work performed by the data storage system for a client request is communicated as a data portion of the HTTP response 254 over connection 202. Data regarding data storage system event reporting may also be communicated as a data portion of the HTTP response 254 over connection 202.

To further illustrate, a user of the GUI 102 may issue a request to provision storage resulting in opening connection 204, and sending an HTTP request 256 from system 36 to system 12. Once the system 12 receives the HTTP request 256, the system 12 may send an HTTP response 258 acknowledging receipt of the HTTP request 256 and then close the connection 204. At some point in time later, the data storage system 12 may execute code which services the request or performs work on behalf of the client request to provision the requested storage. Once processing associated with servicing the client request is complete, a response of information regarding the foregoing processing operation and servicing of the client request may be communicated to the system 36 as a data portion included in the HTTP response 254 transmitted over the first HTTP connection 202. The system 12 may send one or more such data portions which are included in the HTTP response 254 at different points in time, for example, as the data storage system 12 processes client requests, reports on data storage system event occurrences, and the like.

In one embodiment as described herein, communications between the GUI 102 of the management system 36 and the web server 110 of the data storage system 12 may be in accordance with a variety of different protocols as may be represented using the OSI Reference Model having the following 7 layers, from lowest (e.g., Level 1) to highest (Level 7): physical, link, network, transport, session, presentation, and application. At each level, a variety of different protocols may be utilized and understood by the systems 36 and 12.

Figure 5:
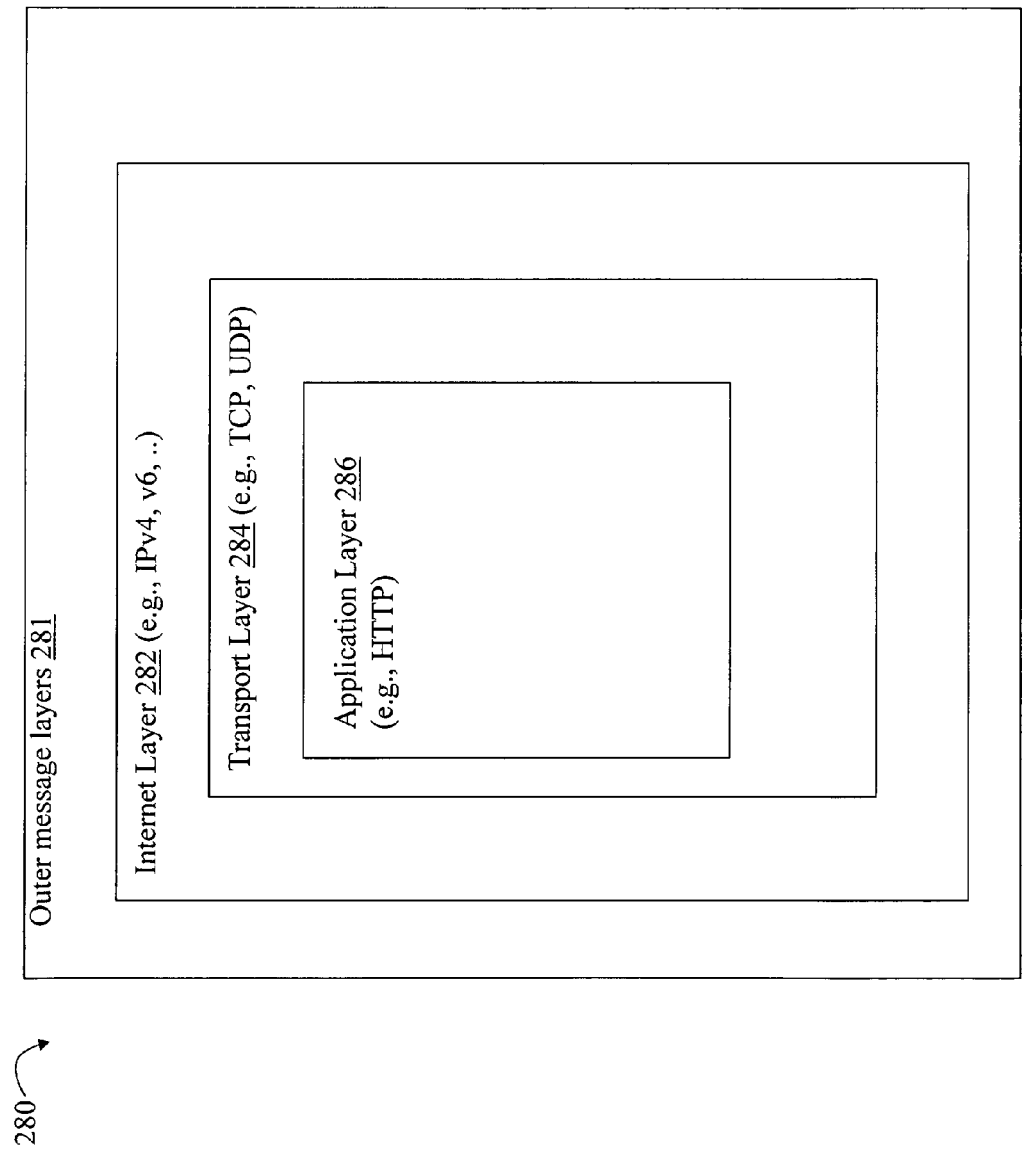
FIGS. 5, 6, and 7 illustrate examples of different message formats and protocols that may be used in connection with the techniques herein.

Referring to FIG. 5, shown is an example representation of a message that may be exchanged between the systems 36 and 12. The example 280 illustrates the various layering that may be included in a message. Generally, data relevant to a higher level or embedded layer may be encapsulated within another data portion of an outer layer. In other words, as you move progressively to higher layers in the model from a first layer to second layer, data portions relevant to the second layer are embedded within the outer layers. With respect to the example 280, layer 282 corresponds to protocols used with the interne or network layer 3, transport layer 284 corresponds to protocols used with the transport layer 4, and the application layer corresponds to protocols used with the application layer 7. Element 281 represents portions of the message used in connection with protocols of layers 1 and 2. Also embedded within element 284 and outside of 286 may be data used in connection with layers 5 and 6.

In connection with the techniques herein, the client, such as system 36, is capable of parsing received transmissions in accordance with the variety of different protocols at each layer to obtain data therefrom. Code included in the system 36 may be used to process the received transmission to retrieve the particular data elements of interest in accordance with the various protocols supported in an embodiment. Code of the system 36 may perform processing necessary to also send messages. Furthermore, the system 12 may also similarly include code to process received messages and send messages to the system 36 in connection with the techniques herein.

At the network or internet layer 282, exemplary protocols that may be used in an embodiment with the techniques herein may include IP (Internet Protocol)v4, and IPv6. At the transport layer, an exemplary protocols may include TCP (Transmission Control Protocol). An exemplary protocol as mentioned elsewhere herein used at the application layer 286 may include HTTP (Hyper Text Transfer Protocol). The protocols used at the application layer 186 vary with the particular application, such as the web browser and/or web server, which is sending/receiving transmissions.

Figure 6:
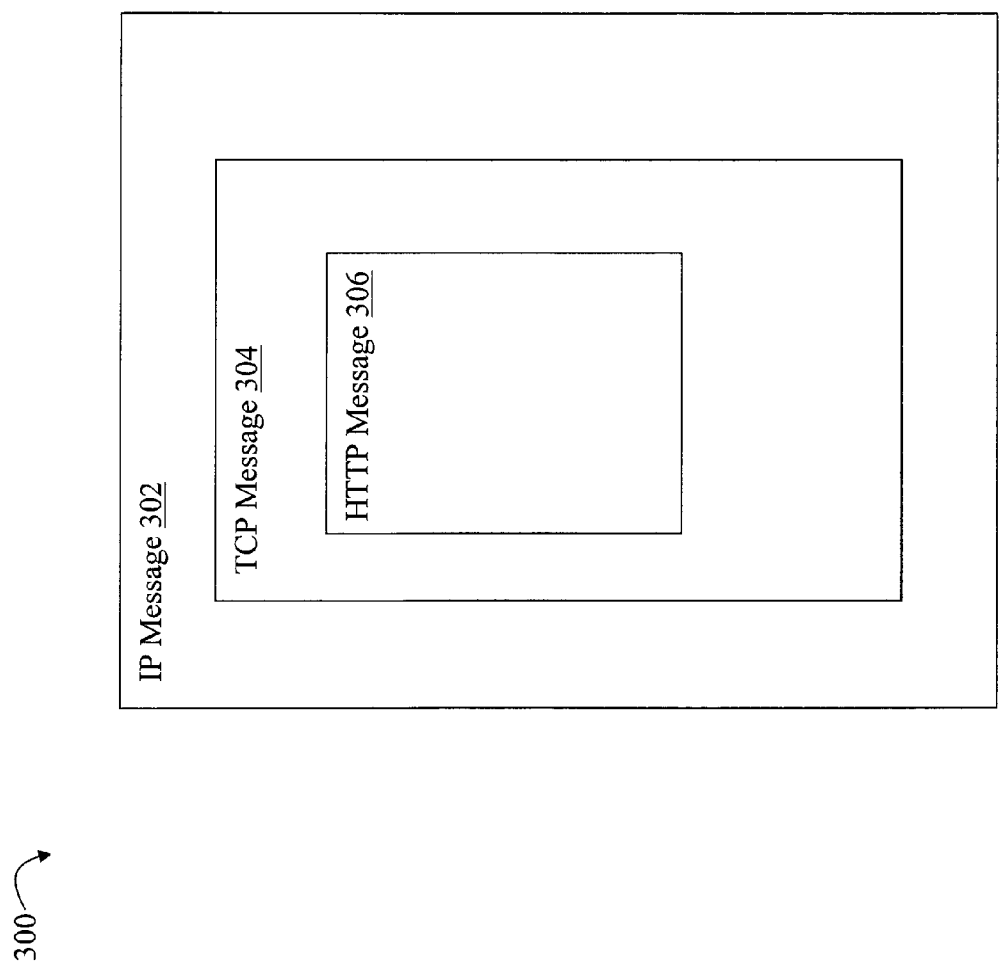

Referring to FIG. 6, shown is an example representation of a message that may be communicated between the systems 12 and 36. The example 300 illustrates an IP message 302 which includes the TCP message 304 as part of the IP message 302. As described herein, code may be executed on the data storage system, such as data storage system 12, and the client system, such as the management system 36, to parse a received message 300 or otherwise send a message having the format represented by 300. Included in the TCP message 304 is an HTTP message 306.

As known in the art, the IP is a network layer protocol that contains addressing information and some control information enabling packets to be routed. As described above, the network layer corresponds to Layer 3 of the OSI Reference Model. TCP is a transport layer protocol that provides for reliable transmission of data in an IP environment. The transport layer corresponds to Layer 4 of the OSI Reference Model. HTTP is an example of an application protocol that may be used in connection with Layer 7, the application layer. HTTP is an application protocol used, for example, by a web browser when communicating with a web server of the data storage system 12.

In the example 300, a first message format, such as HTTP, is encapsulated within another message format, such as that of a TCP/IP message. It should be noted that although both HTTP and TCP/IP are described herein for purposes of illustration, other messaging formats and protocols may be used in connection with the techniques herein. For example, the HTTP message may be encapsulated in accordance with another format besides TCP/IP depending on the network over which the message is sent, or another message using a different application layer protocol besides HTTP may be encapsulated in the TCP/IP message. The client system 36 may execute code which processes the various portions of the received message. For example, the client system 36 may include code which provides for extracting and passing appropriate portions of a received message up the network stack from the lowest to the highest level, the application level. Similarly, the client system 36 may include code which provides for sending messages down the network stack (e.g., from the application level down to the lowest level).

Figure 7:
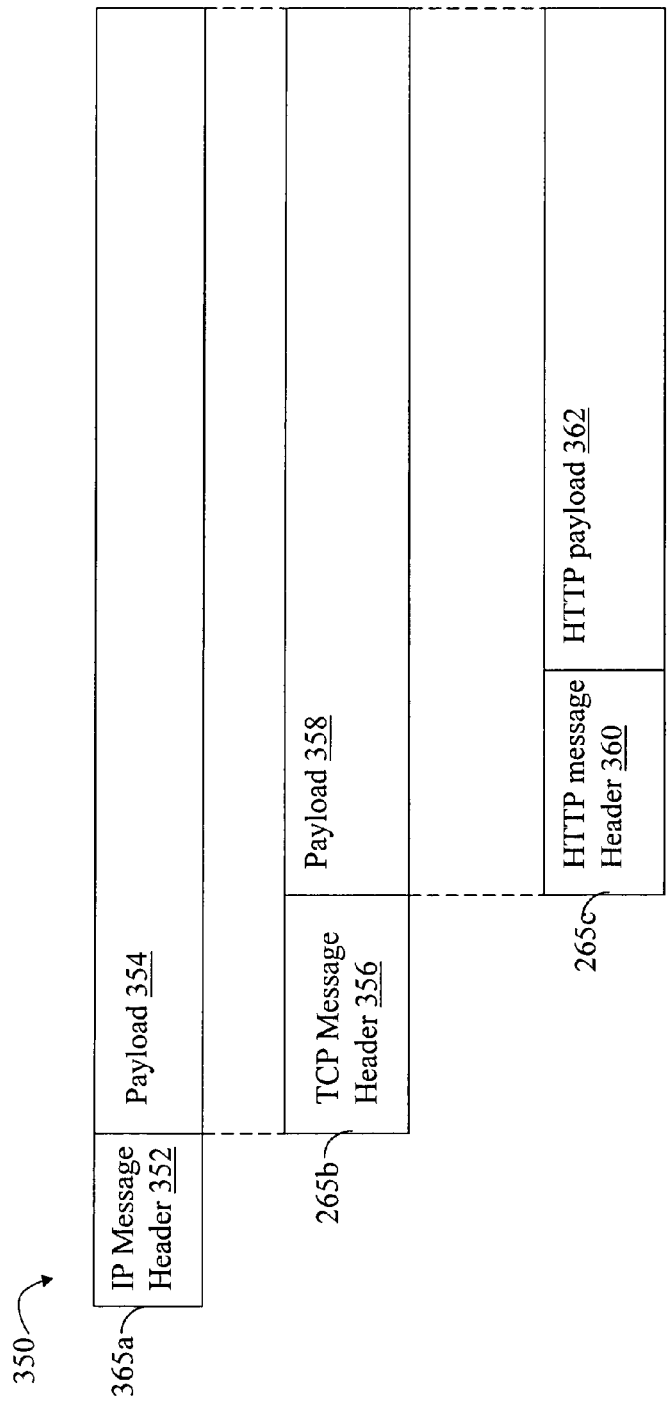

Referring now to FIG. 7, shown is another example illustrating a message that may be transmitted between systems 12 and 36 over a TCP/IP network. The example 350 includes additional detail on the portions of the message and encapsulation. The IP message 365*a* includes an IP message header 352 and a payload 354. The payload 354 of the IP message 365*a* includes the TCP message 365*b*. The TCP message 365*b* includes a TCP message header 356 and payload 358. The payload 358 of the TCP message 365*b* includes an HTTP message 365*c*. The HTTP message 365*c* includes an HTTP message header 360 and payload 362.

Processing may be performed on the client system to extract desired information from the different messages in accordance with the supported protocols and formats. For example, a message received on the client system is processed and passed up the network stack until the application layer is reached. At each layer, portions of the received message may be extracted and portions may be passed to any remaining upper layers above the current processing layer. The code on the data storage system may similarly parse a received transmission in accordance with the different protocol formats to obtain one or more data elements of interest at the various layers. Similarly, both the client system and the data storage system may include code used in connection with sending messages. In one embodiment, the web server on the data storage system (the server system) and the GUI on the management system 36 (the client system) may communicate using HTTP V1.1.

In accordance with the communications protocols that may be used in an embodiment described herein, each HTTP request message and each HTTP response message may have a general format as illustrated by 265*c*. The HTTP response message may include a header. With reference back to FIG. 4 and in connection with the single HTTP response 254 sent over connection 202 for each client-server session, a value indicating the size of the payload portion of the HTTP response 254 may be omitted from the message header 360 of the response 254. The size value may be optionally specified in accordance with the HTTP V1.1 standard. The one or more data portions sent over connection 202 as also described herein may be included in the payload 262 of the HTTP response 254.

Figure 8:
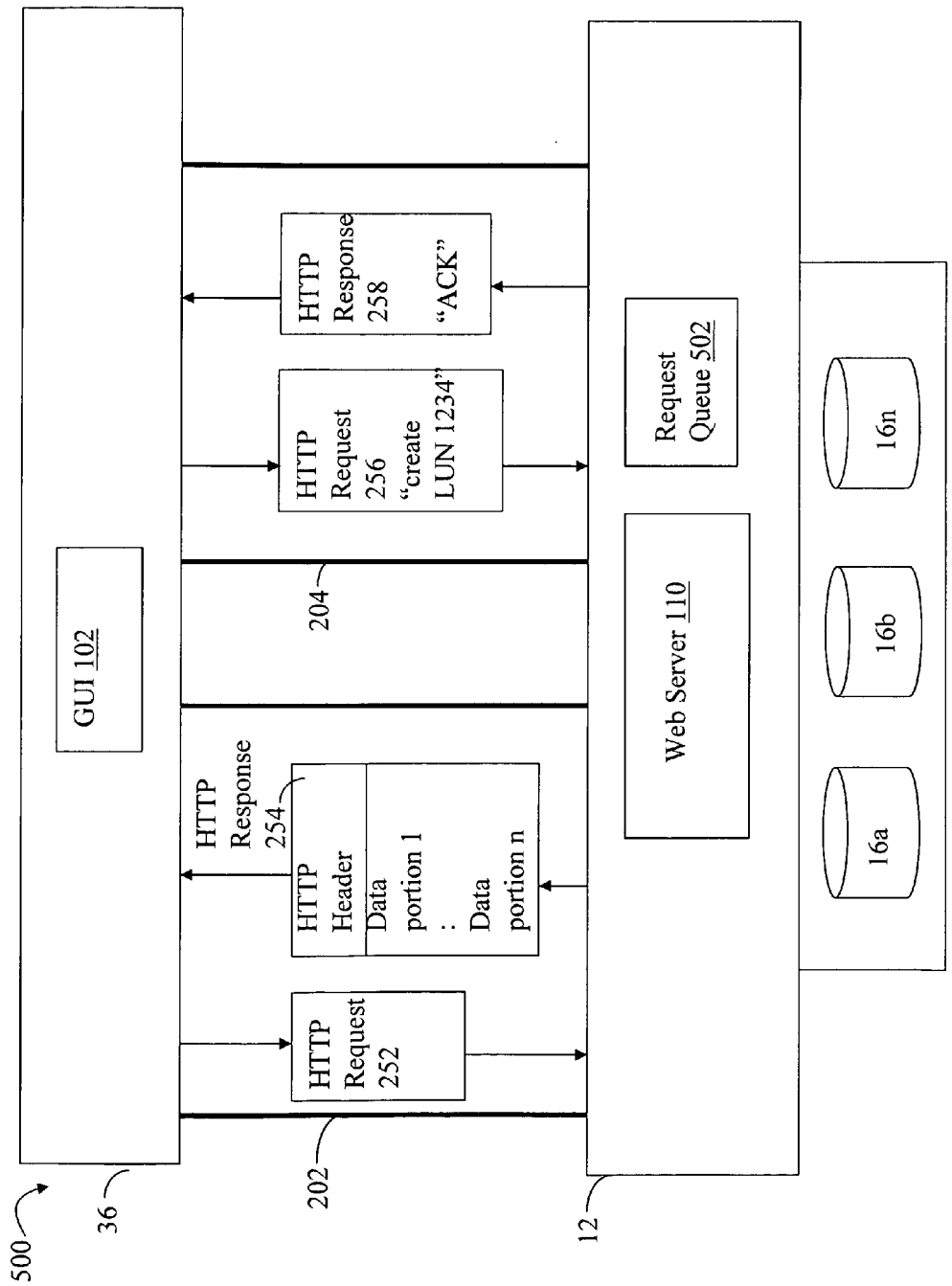
FIG. 8 is an example illustrating requests and responses that may be issued over the communication connections in accordance with an embodiment using the techniques herein.

Referring to FIG. 8, shown is an example illustrating in more detail the HTTP requests and responses that may be sent over the HTTP connections. The example 500 illustrates the single HTTP request 252 and the single HTTP response 254 sent over the first HTTP connection 202. The payload of the HTTP response 254 is illustrated as including n data portions for the n logical items or entities about which the data storage system 12 is asynchronously reporting to the system 36. Each data portion may correspond, for example, to response data or status information for a previously received client request (e.g. HTTP request received on connection 204), an occurrence of one or more data storage system events (e.g. device error, power supply status, new device installed, available storage status), and the like. Also illustrated is a single HTTP request 256 and a corresponding single HTP response 258 sent over the second HTTP connection 204. The request 256 may correspond to a client request in this example to create LUN 1234. The connection 204 may be opened and the request 256 may be transmitted from system 36 to system 12. In response, the system 12 may send HTTP response 258 to the system 36 acknowledging receipt of the request 256. The system 12 may then close the HTTP connection 204. The foregoing opening and closing the connection 204 may be performed for each client request submitted to the system 12 over the connection 204. The system 12 may create an entry in the request queue 502 for each of the received HTTP requests 256. In this example, the queue 502 may represent the list of work to be performed or client requests to be serviced by the data storage system 12. At some point later, the system 12 selects the entry for request 256 from the queue for processing and creates LUN 1234. In connection with the client request to create a LUN, the system 12 may report information to the system 36 once the client request has been serviced, or the system 12 cannot otherwise complete servicing of the request (e.g., such as due to an error). The information may be communicated to the system 36 as one of the data portions of the HTTP response 254. Once the system 36 receives the data portion, the code of the GUI may extract the data portion and accordingly update the displayed GUI, for example, to indicate that the requested LUN 1234 has been successfully created as indicated by the data portion. If the user of the system 36 issues a subsequent client request using the GUI 102, a corresponding HTTP request and response are issued over a new instance of HTTP connection 204 by opening a new connection, transmitting the request and response, and then closing the connection 204. The foregoing may be repeated for each client request. Responses generated by the system 12 as a result of servicing or performing work for the subsequently issued client requests are communicated over connection 202 as other data portions of the HTTP response 254.

In this example, the user of the GUI may close the browser on the system 36 and the web server 110 is accordingly notified signifying the end of the client-server session. As such, closing of the connection 202 for each session may be used by the server as means for tracking which one or more sessions are still current or active at a point in time. This allows the server, or data storage system 12 in this example, to perform particular optimizations based on knowledge of what GUI clients are connected at a point in time and when they disconnect. For example, the server may cache information for each client-server session and clear such information from the server-side cache on the data storage system when the GUI for the current browser session is no longer open or connected over connection 202 (e.g. when the system 12 is notified regarding a particular instance of a connection 202 closes). Thus, more generally, the server may use such knowledge for more efficient management of data storage system resources.

The data portions of the HTTP response 254 may be delimited using any type of delimiter or divider which is understood by the systems 12 and 36 to partition the payload of the response 254 into data portions included therein. Each data portion may correspond to one logical response or report about which the system 12 is communicating to the system 36. From an HTTP perspective, the foregoing data portions for a single client-server session are included in a single HTTP response 254. In one embodiment, the data portions may be encapsulated in XML such that the structure of the XML is used to denote the partitioning of the payload of 254 into different data portions.

The HTTP connections 202 and 204 may be established using standard network communications. For example, as described herein, the HTTP connection may be established in accordance with the network protocol stack such as on top of, or using, a TCP connection. When one of the lower layers in the stack, such as the TCP layer, is notified that the connection has been closed, upper layers in the stack are subsequently notified in turn. For example, the TCP layer in turn notifies the HTTP layer, and so on up the network stack until the browser and GUI code on the client side and the web server on the server side are notified of any such connection closing.

It should be noted that the data storage system 12 can process the received client requests in the request queue 502 in any order. For example, the data storage system 12 may prioritize received HTTP requests corresponding to client requests received over connection 204. The prioritization may be indicated, for example, by a field in the payload portion of each request 256, implicitly based on the type of client request or operation, and the like.

Referring to FIG. 9A, shown is an example illustrating in more detail the format of the HTTP response 254 sent over the first HTTP connection 202. The response in the example 400 includes an HTTP response header 402 and HTTP response payload 404 comprising one or more sever response data portions 404a-404n Additional details regarding the formats of the header 402 and payload 404, as well as header and payloads of requests, are in accordance with the HTTP or other standard used in an embodiment.

Each data portion 404a-404n may be transmitted at different points in time by the data storage system 12 over connection 202 during the duration of client-server session (e.g., GUI-web server session) until the session terminates such as when browser closes or there is a problem with the first connection 202. Data portion n 404n corresponds to the last response or report from the data storage system for the associated client-server session.

Figure 9B:
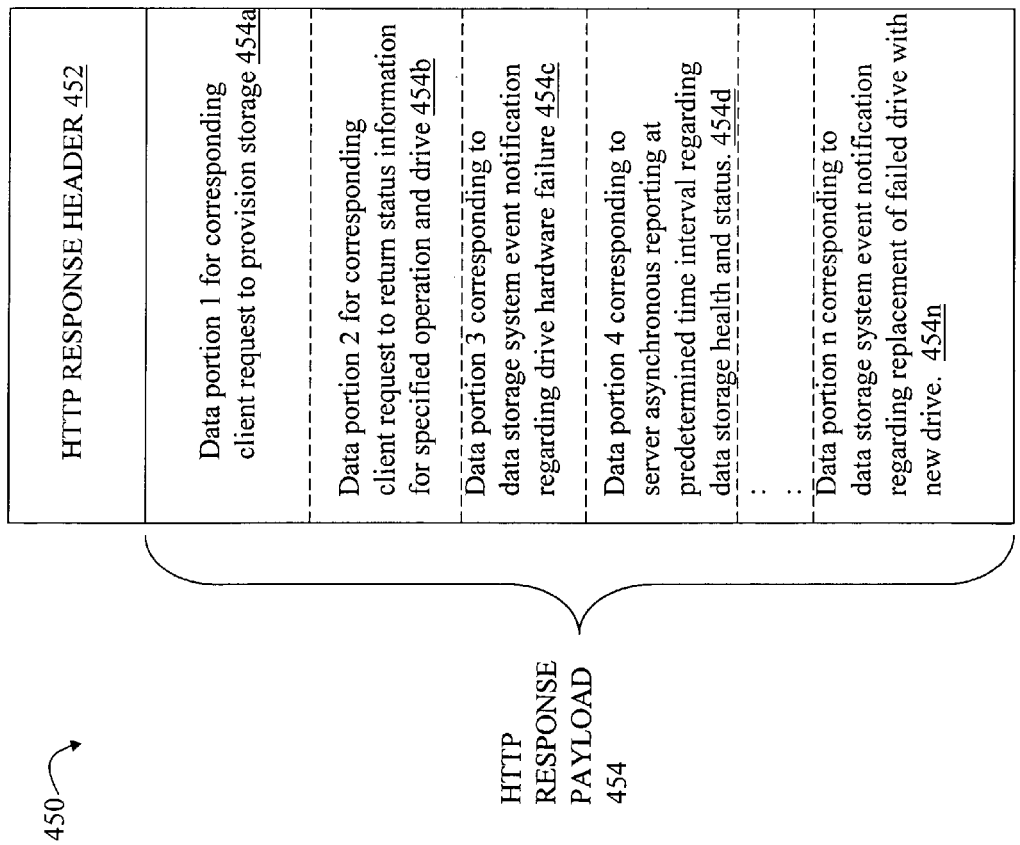

Referring to FIG. 9B, shown is an example further illustrating an instance of the HTTP response 254 sent over the first HTTP connection 202 for a single client-server (GUI-web server) session. In this example, data portion 1, 454a, corresponds to a response or results related to a client request to provision storage. Data portion 2, 454b, corresponds to a response or results related to a client request to return status information regarding a specified operation and drive. Data portion 3, 454c, corresponds to an asynchronous data storage system event reporting regarding drive hardware failure. Data portion 4, 454d, corresponds to an asynchronous data storage system event reporting at a predetermined time interval regarding general data storage system health and status. Data portion 4 may be transmitted asynchronously from the system 12 to the system 36 at predetermined time intervals to batch or group any reported information regarding the data storage system health. Information reported in connection with data portion 4 may be characterized as an event which does not require immediately notifying the system 36. Data storage system events may be categorized or associated with different levels of severity so that event occurrences for one or more levels of severity require immediate reporting. The remaining severity levels may be associated with events having occurrences which may be batched or reported collectively. If there are no event occurrences to report for the batch or group at the predetermined time interval, no data portion may be included in the payload 454. Data portion n, 454n, corresponds to an asynchronous data storage system event reporting regarding replacement of the drive hardware failure reported in connection with data portion 3, 454c.

What will now be described are flowcharts summarizing processing steps described above.

Figure 10:
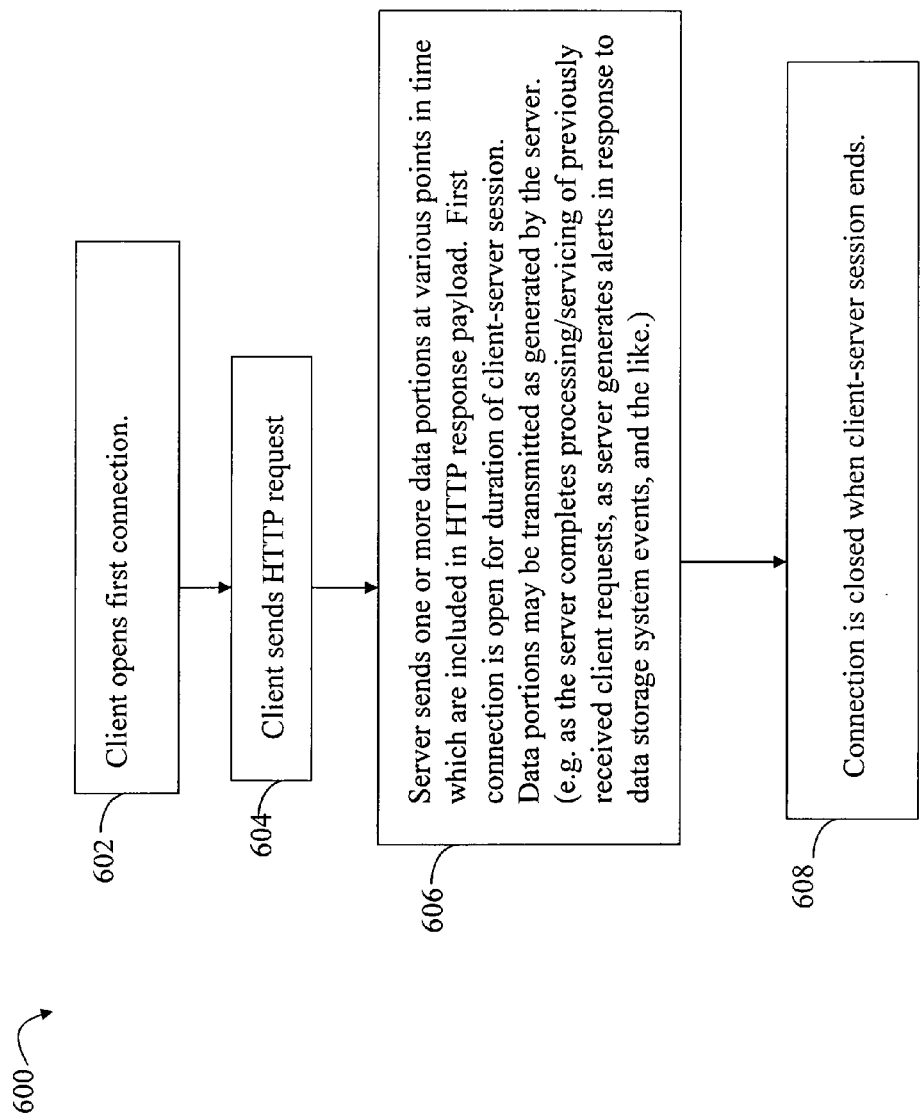
FIGS. 10, 11, 12, 13, and 14 are flowcharts of processing steps that may be performed in an embodiment in accordance with techniques described herein.

Referring to FIG. 10, shown is a flowchart of processing steps that may be performed in an embodiment in connection with establishing and opening the first HTTP connection which remains open for the duration of a client-server session. The steps of flowchart 600 may be performed when opening the first HTTP connection 202 such as, for example, as part of processing when a new instance of the web browser is started for a session communicating with the web server of the data storage system 12. At step 602, the client opens the first HTTP connection. At step 602, the client sends an HTTP request over the first HTTP connection. At step 606, the server sends one or more data portions at various times as the HTTP response payload over the first connection. The data portions may be transmitted as generated by the server and no length of the payload of the request is specified in the HTTP response header. At step 608, the first HTTP connection is closed when the client-server session commenced in connection with step 602 is ended. The first HTTP connection may be closed by the web server of the data storage system 12, for example, in response to receiving notification that the web browser of the client (management system) has closed.

Figure 11:
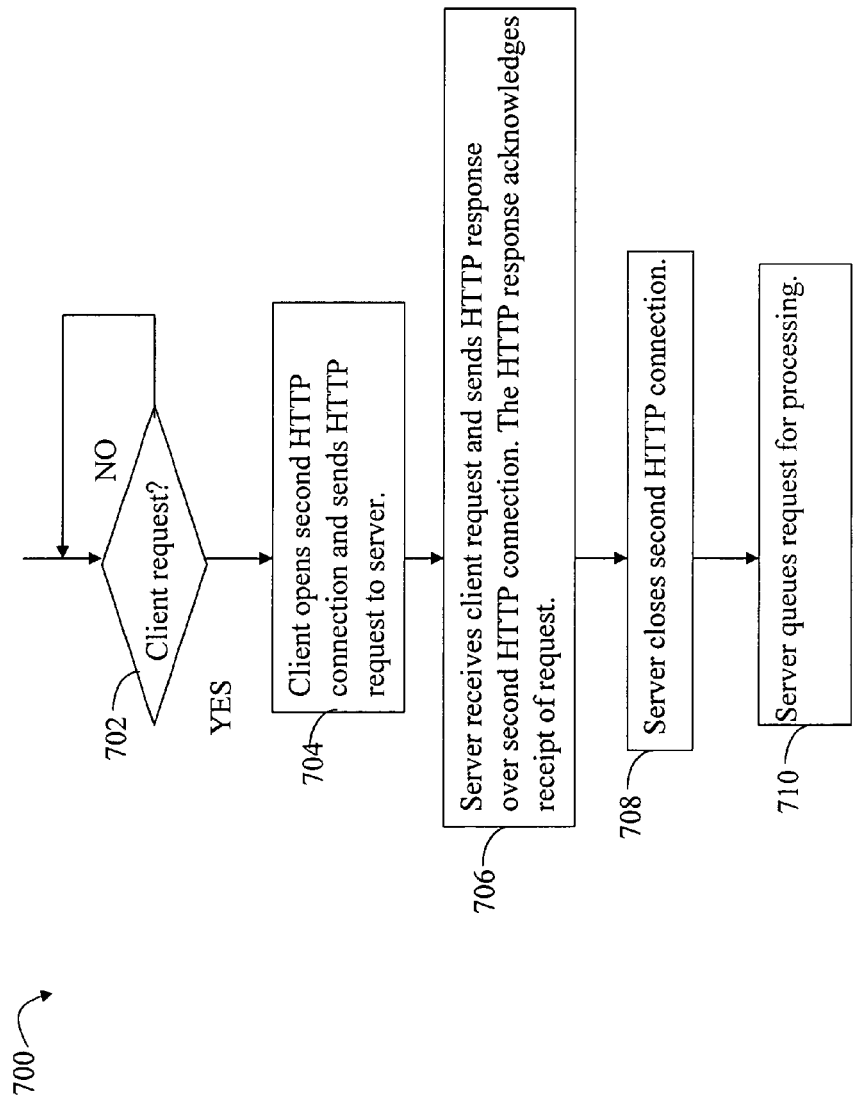

Referring to FIG. 11, shown is a flowchart of processing steps that may be performed in an embodiment in connection with creating an instance of the second HTTP connection for submission of a client request. The steps of flowchart 700 may be performed when an instance of the second HTTP connection 204 is opened in response to a client request being submitted, for example, using the GUI. The steps of flowchart 700 for opening and closing an instance of the second HTTP connection may be performed for each client request submitted from system 36 to system 12. At step 702, processing waits for a client request to be submitted. Once a client request has been submitted, such as via the GUI of the management system 36 (e.g., client), control proceeds to step 704 where the client opens the second HTTP connection and sends an HTTP request representing the client request to the web server of the data storage system (e.g., server) over the second HTTP connection. At step 706, the server receives the HTTP request corresponding to the client request and sends an HTTP response over the second HTTP connection acknowledging receipt of the HTTP request. At step 708, the server closes the second HTTP connection. At step 710, the server queues the client request for later processing by the server. It should be noted that the data storage system as the server may elect to process the received HTTP request from step 706 immediately in accordance with an established priority hierarchy or leveling. Requests may be prioritized as received by the server. The priority of a client request may be indicated in the request or otherwise determined by the server to determine a processing or servicing order with respect to other client requests and work to be performed.

Figure 12:
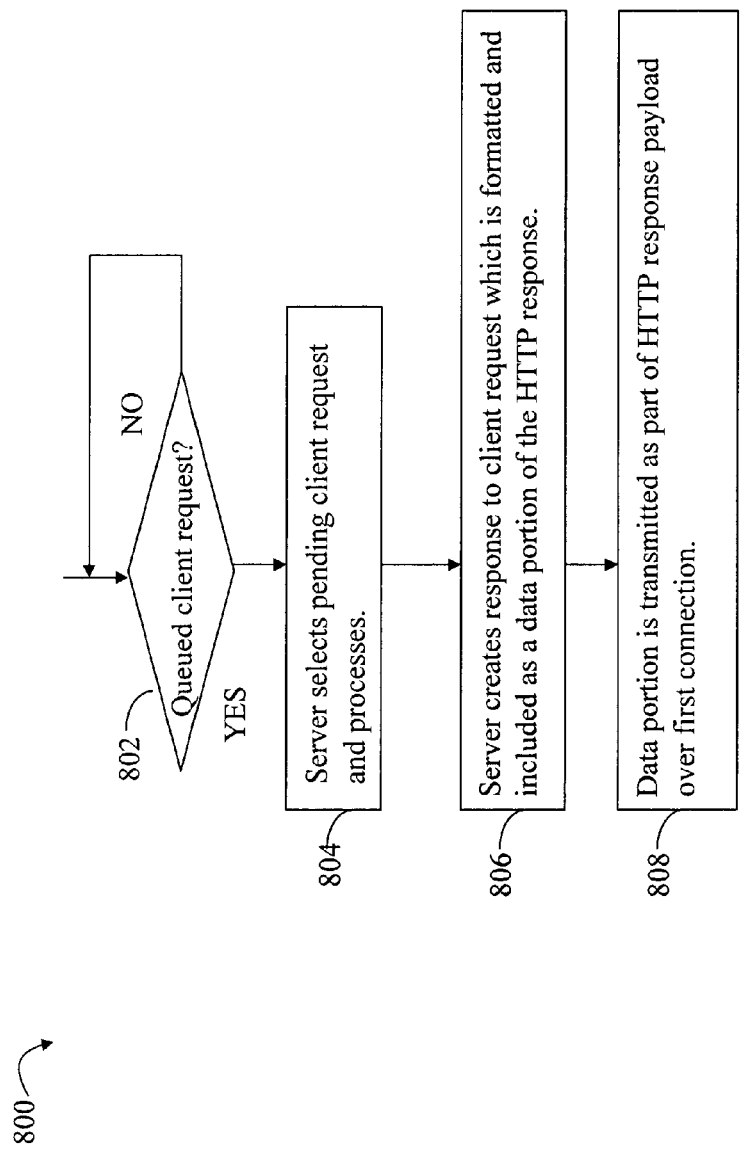

Referring to FIG. 12, shown is a flowchart of processing steps that may be performed in an embodiment by the server in connection with processing received client requests from the queue. The steps of flowchart 800 may be performed by a server, such as the data storage system, in connection with processing received client requests. At step 802, a determination is made as to whether there are any queued client requests waiting to be processed. If not, processing waits at step 802 until a client request is queued. Control then proceeds to step 804 where the server selects a pending client request from the queue for processing. At step 806 once the selected client request from step 804 has been processed, the server creates a response for the selected request which is appropriately formatted and included as a data portion in the HTTP response (e.g., 254). At step 808, the data portion from step 806 is transmitted as part of the HTTP response payload over the first HTTP connection 202 (as opened in connection with FIG. 10 processing).

Figure 13:
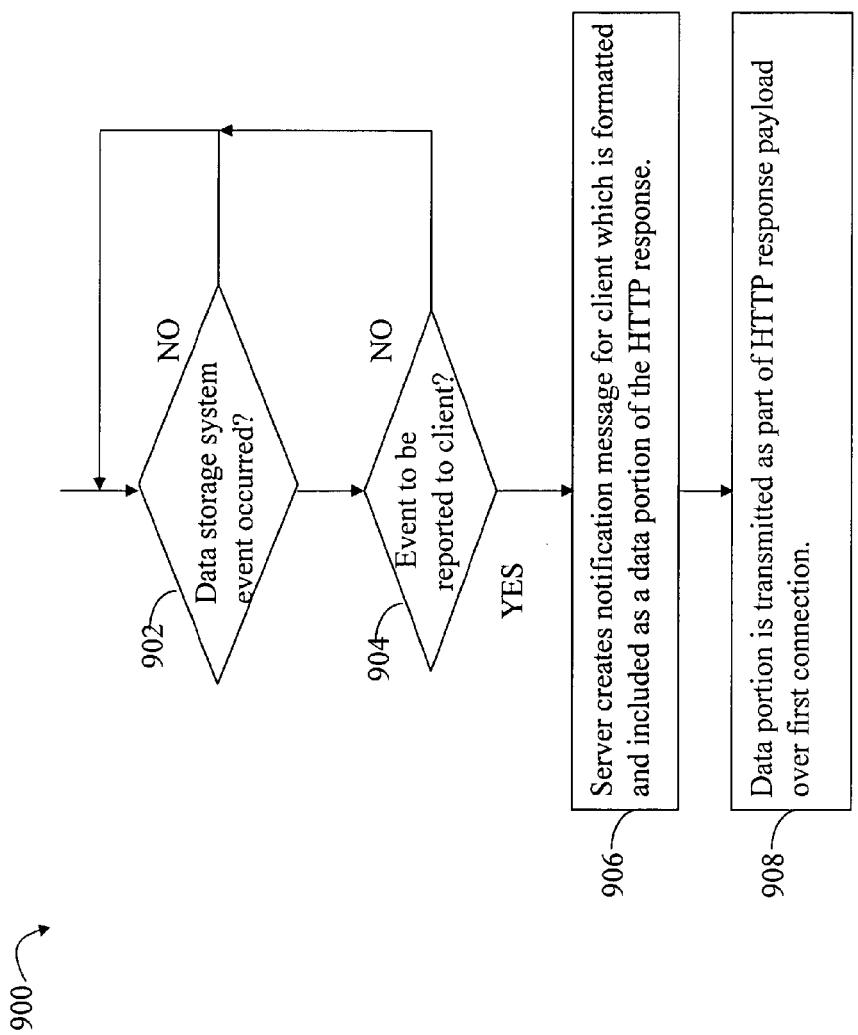

Referring to FIG. 13, shown is a flowchart of processing steps that may be performed in an embodiment in connection with the data storage system, as the server, generating alerts or notifications regarding the occurrence of asynchronously reported data storage system events. At step 902, a determination is made as to whether any data storage system events have occurred. If not, control remains at step 902 until such an event occurs and then control proceeds to step 904. At step 904, a determination is made as to whether the event occurrence is one which is to be reported to the client. If not, control returns to step 902. Otherwise, control proceeds to step 906. At step 906, the server creates a notification or alert message for the client which is appropriately formatted and included as a data portion of the HTTP response (e.g., 254). At step 908, the data portion from step 906 is transmitted as part of the HTTP response payload over the first HTTP connection 202 (as opened in connection with FIG. 10 processing). In connection with step 906, the server may report the event occurrence immediately or may batch information for multiple event occurrences depending on the severity that may be associated with the event occurrence.

Figure 14:
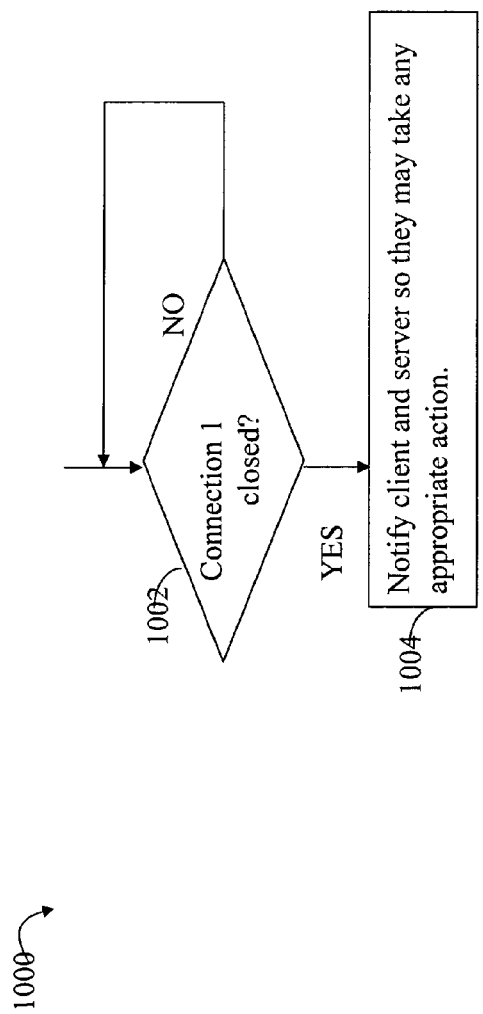

Referring to FIG. 14, shown is a flowchart of processing steps that may be performed in an embodiment in connection with the first HTTP connection opened in connection with FIG. 10 processing. At step 1002, a determination is made as to whether the first HTTP connection has been closed. If not, processing waits at step 1002 until the first HTTP connection is closed causing control to proceed to step 1004. At step 1004, the client and server are notified of the connection closing so each may take an appropriate responsive action as described elsewhere herein.

In connection with the techniques for the embodiment described herein, two HTTP connections may be utilized due to the two HTTP connection limit as set forth in accordance with the HTTP V1.1 standard. It should be noted that in the HTTP V1.1 standard, this limit may be characterized as a general guideline or recommendation which should be implemented. Other standards may have other hard imposed limitations. In an embodiment of a web browser which adopts or imposes the foregoing two HTTP connection limit, the web browser is allowed to only have two active HTTP connections to one given server in a domain at a point in time. In other words, at most two outstanding HTTP requests may be issued from the web browser to a web server for a particular domain name. Thus, the techniques herein provide for configuring a system in accordance with such limits or restrictions. The techniques may also be used in connection with a protocol or standard having a different connection limit or with a protocol which does not have a connection limit. In connection with both of the foregoing, an embodiment may use two connections as described herein to provide for efficient resource utilization. In connection with an embodiment using an application level or other protocol which allows more than two connections at a time for a single client-server session, an embodiment may use the techniques herein with more than two total connections. For example, at a current point in time, an embodiment may open and utilize a single instance of connection 202 for the session duration, and may allow up to a maximum number of connections 204 where the maximum number is more than one. The number of connection 204 open at a point in time may be in accordance with a number of client requests currently being submitted to the data storage system 12 (e.g., each connection 204 instance at a point in time corresponding to submission of a single client request to the system 12 for processing). As another example, at a current point in time, an embodiment may open and utilize more than one instance of connection 202 (e.g., may have multiple connections open for the duration of the client-server session used for asynchronously sending information from 12 to 36 in a single HTTP response), and may use a single connection 204 (e.g., only allow a single HTTP request at any point in time in connection with client request submission where the single connection 204 is opened and closed for each client request). As yet another example at a current point in time, an embodiment may open and utilize more than one instance of connection 202, and may allow up to a maximum number of connections 204 where the maximum number is more than one. A number of connections 202 and/or 204 utilized may vary in accordance with limits of the particular protocol(s) used in an embodiment. The foregoing and other variations of the techniques herein will be appreciated by those of ordinary skill in the art given the benefit of this disclosure.

As described herein, an embodiment may use asynchronous notification techniques to provide the client software on the management system with notification regarding changes to data storage system state information as well as in connection with response to client requests where the responses relate, for example, to status and/or work performed by the data storage system for the client request. A change in data storage system state may include a change regarding status of hardware and/or software in the data storage system. Various examples are provided at other points herein. An embodiment may use asynchronous event notification techniques rather than a synchronous polling technique with a request for such information being initiated by the client, such as system 36. In an embodiment as described here with asynchronously reporting the occurrence of data storage system events to the system 36, a module or routine included in the server code on the data storage system may be registered to receive notification of particular events related to changes in data storage system state. Upon the occurrence of one of the registered events, notification (including information about the event) is sent to the registered module or routine on the data storage system which, in turn, may create a corresponding data portion included in an HTTP response payload (e.g., such as of the response 254) sent to the system 36.

In accordance with techniques herein, code of the client may automatically track the state of the data storage system and accordingly perform appropriate processing. For example, the GUI may perform processing in response to data received over the first HTTP connection 202 including appropriately updating the displayed GUI. Thus, the user may be provided with a GUI which is responsive to changes in the data storage system state (e.g., device errors, device replacements/additions, power supply status, storage availability for provisioning, and the like), and also in response to previously issued client requests (e.g., to provision storage, specific inquiry or display of information, and the like). Such information may be communicated from the server to the client over the first HTTP connection which remains for the duration of the client-server session.

The techniques described herein provide for efficient resource utilization on the management system 36, data storage system 12, and network or other connections(s) facilitating communications therebetween. Both the client, such as the system 36, and the server, such as the data storage system 12, are notified when there is a problem or unavailability of the communication connection 202 therebetween. Through the use of the first HTTP connection 202, the data storage system, as the server, has knowledge regarding what client sessions are still active allowing the server to optionally perform optimizations for further efficient use of data storage system resources. The techniques herein provide for asynchronous reporting to the client regarding data storage system events as well as responses in connection with work performed by the data storage system for previously received client requests. Through the asynchronous event reporting, the client is notified in an expedient and timely manner regarding desired data storage system event occurrences. The use of the second HTTP connection 204 for submission of client requests and not allocating (e.g., keeping the connection open) an HTTP connection for the duration while servicing each client request may reduce performance bottlenecks.

It should be noted that in an embodiment as described herein using the HTTP V1.1 protocol, responses may be sent from the server to the client with, or without, chunked transfer encoding being utilized. As known in the art in accordance with the HTTP V1.1 protocol, chunked transfer encoding provides for a chunked message body containing response data, chunk size, and optional other information. Use of such chunked transfer encoding may be used in combination with an internal delimited HTTP response payload (e.g., partitioning the response into data portions) as communicated over the first communication connection 202 described herein. The internal delimited response payload may be the result of applying a delimited format partitioning the response payload into data portions as described herein. In addition to this internal delimited response formatting, the HTTP response payload may be divided into chunks in accordance with the HTTP standard. In other words, the chunk encoding partitioning may be superimposed on top of, or after performing processing in accordance with, the internal delimited response payload described herein. Chunk boundaries may not correspond to a data portion boundary in such an embodiment. Alternatively, an embodiment may not utilize chunk transfer encoding (such as for the HTTP response payload of response 254) in combination with the internal delimited formatting used to partition the payload into data portions. Rather, an embodiment may only perform processing to partition the payload into the delimited data portions as described herein.

It should be noted that the techniques herein have been described with reference to managing a data storage system. The techniques herein may also be used more generally in connection with management of other systems besides data storage systems. More generally, the techniques herein may be used in connection with facilitating communications between a client and a server.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for facilitating communications between a client and a server comprising:
    opening a first communication connection between the client and the server, wherein said first communication connection remains open for a duration of a session between the client and the server;
    in response to receiving a client request on the client, opening second communication connection, sending said client request over said second communication connection from said client to said server, sending a first response from said server to said client over the second communication connection, and closing the second communication connection, wherein said first response indicates that said client request has been received by said server;
    performing, by the server, processing to service the client request; and
    sending a data portion indicating a status of the client request to the client over the first communication connection, wherein said data portion is included in a second response sent from the server to the client over the first communication connection, wherein if there are other client requests from the client received by the server and processed during said session, additional data portions for said other client requests are included in the second response, wherein said second response sent over the first communication connection omits specifying a size of a payload of said second response in a header of said second response, wherein the server is a data storage system, the client request issued over the second communication connection to the server is a request to provision storage of the data storage system, and the data portion of the second response is sent to the client after the data storage system has completed servicing the client request by provisioning requested storage, said data portion indicating any of a status or result regarding servicing the client request.

2. The method of claim 1, wherein for the duration of the session, only a single response is sent from the server to the client over said first communication connection at an application level, said single response being said second response and including data portions for all client requests sent from the client to the server which are processed during the session.

3. The method of claim 1, wherein the second response includes one or more data portions for one or more corresponding asynchronous events reported from the server to the client, each of said asynchronous events being in response to an occurrence of at least one data storage system event.

4. The method of claim 3, wherein said at least one data storage system event includes at least one of: a change in data storage system state, an error of a data storage system component, a status change for a data storage system component, a device error, a power supply level, and a device replacement.

5. The method of claim 1, wherein said first response does not provide an indication regarding servicing status or completion status of the client request.

6. The method of claim 1, wherein said server includes a web server in the data storage system.

7. The method of claim 6, wherein said client includes a web browser executing code providing a user interface used to input client requests on a computer system in communication with the data storage system.

8. The method of claim 1, wherein said first communication connection and said second communication connection are connections used for communications between the client and the server in accordance with an industry standard communication protocol at an application network level.

9. The method of claim 8, wherein said industry standard protocol is a hypertext transfer protocol.

10. The method of claim 1, wherein, for each client request sent from the client to the server, said steps of opening the second communication connection, sending said each client request over said second communication connection from said client to said server, sending another response from server to said client over the second communication connection, and closing the second communication connection, are performed for said each client request, wherein said another response indicates that said each client request has been received by said server and does not provide an indication regarding a status of processing on said server with respect to servicing said each client request.

11. The method of claim 1, wherein data portions included in the second response are included in a payload of the second response in accordance with a format delimiting each of the data portions enabling said client to partition said payload and extract said data portions therefrom.

12. The method of claim 1, wherein for the duration of the session, a single request is sent from the client to the server and a single response is sent from the server to the client over the first communication connection, said second response being said single response.

13. The method of claim 1, further comprising:
opening one or more other communication connections between said client and said server at a point in time, each of said one or more other communication connections either remaining open for the duration of the session and being used to transmit only a single response thereon from the server to the client, or being opened and closed for each client request and corresponding response communicated thereon between the client and the server.

14. The method of claim 2, wherein said second response is a single message in accordance with a communication protocol, said single message having a payload comprising one or more data portions, each of said data portions corresponding to a client request received by the server or an event occurring on the server being reported to the client, said first communication connection being used to asynchronously report information to the client.

15. A non-transitory computer readable medium comprising executable code stored thereon for facilitating communications between a client and a server, the non-transitory computer readable medium comprising executable code that, when executed, performs a method comprising:
opening one or more instances of a first communication connection between the client and the server, wherein each instance of said first communication connection remains open for a duration of a session between the client and the server;
opening up to a maximum number of instances of a second communication connection at a point in time used to submit client requests to the server, wherein, in response to receiving a client request on the client, an instance of said second communication connection is opened, said client request is sent over said instance of the second communication connection from said client to said server, an acknowledgment message is sent from said server to said client over the instance of the second communication connection, and the instance of the second communication connection is closed;
performing, by the server, processing to service the client request; and
sending a data portion indicating a status of the client request to the client over one of said instances of the first communication connection, wherein said data portion is included in a single response sent from the server to the client over the said one instance of the first communication connection for the duration of the session, wherein if there are other client requests from the client received by the server and processed during said session, additional data portions for said other client requests are included in the single response, wherein said single response omits specifying a size of a payload of said single response in a header of said single response, wherein the server is a data storage system, the client request issued over the instance of the second communication connection to the server is a request to provision storage of the data storage system, and the data portion of the single response is sent to the client after the data storage system has completed servicing the client request by provisioning requested storage, said data portion indicating any of a status or result regarding servicing the client request.

16. A non-transitory computer readable medium comprising executable code stored thereon for facilitating communications between a client and a server, the non-transitory computer readable medium comprising executable code that, when executed, performs a method comprising:
opening a first communication connection between the client and the server, wherein said first communication connection remains open for a duration of a session between the client and the server;
in response to receiving a client request on the client, opening a second communication connection, sending said client request over said second communication connection from said client to said server, sending a first response from said server to said client over the second communication connection, and closing the second communication connection, wherein said first response indicates that said client request has been received by said server;
performing, by the server processing to service the client request; and
sending a data portion indicating a status of the client request to the client over the first communication connection, wherein said data portion is included in a second response sent from the server to the client over the first communication connection, wherein if there are other client requests from the client received by the server and processed during said session, additional data portions for said other client requests are included in the second response, wherein said second response sent over the first communication connection omits specifying a size of a payload of said second response in a header of said second response, wherein the server is a data storage system, the client request issued over the second communication connection to the server is a request to provision storage of the data storage system, and the data portion of the second response is sent to the client after the data storage system has completed servicing the client request by provisioning requested storage, said data portion indicating any of a status or result regarding servicing the client request.

17. The non-transitory computer readable medium of claim 16, wherein for the duration of the session, only a single response is sent from the server to the client over said first communication connection at an application level, said single response being said second response and including data portions for all client requests sent from the client to the server which are processed during the session.

18. The non-transitory computer readable medium of claim 16, wherein the second response includes one or more data portions for one or more corresponding asynchronous events reported from the server to the client, each of said asynchronous events being in response to an occurrence of at least one data storage system event.

19. The non-transitory computer readable medium of claim 18, wherein said at least one data storage system event includes at least one of: a change in data storage system state, an error of a data storage system component, a status change for a data storage system component, a device error, a power supply level, and a device replacement.

20. The method of claim 1, wherein at least one data portion included in the second response is included as a result of an occurrence of any of a server-initiated event, a predetermined time interval for event reporting regarding data storage system health and status, and a data storage system event having a severity requiring immediate notification to the client.

* * * * *